(12) United States Patent
Hsieh

(10) Patent No.: US 6,874,900 B2
(45) Date of Patent: Apr. 5, 2005

(54) PANEL LIGHT SOURCE DEVICE AND LIQUID CRYSTAL DISPLAY DEVICE

(75) Inventor: Chih Chieh Hsieh, Pingtung (TW)

(73) Assignee: Hannstar Display Corp. (TW)

( * ) Notice: Subject to any disclaimer, the term of this patent is extended or adjusted under 35 U.S.C. 154(b) by 110 days.

(21) Appl. No.: 10/458,375

(22) Filed: Jun. 11, 2003

(65) Prior Publication Data

US 2004/0042194 A1 Mar. 4, 2004

(30) Foreign Application Priority Data

Sep. 2, 2002 (TW) .................................. 91120402 A

(51) Int. Cl.$^7$ ............................................. G01D 11/28
(52) U.S. Cl. ........................... 362/26; 362/29; 362/97; 362/559
(58) Field of Search ............................ 362/26, 27, 23, 362/31, 29, 97, 224, 559–561, 236; 349/62–65, 67, 70

(56) References Cited

U.S. PATENT DOCUMENTS

| 5,477,422 A | | 12/1995 | Hooker et al. |
| 5,485,354 A | * | 1/1996 | Ciupke et al. ................ 362/31 |
| 6,164,790 A | | 12/2000 | Lee |
| 6,674,250 B2 | * | 1/2004 | Cho et al. ................... 315/291 |

* cited by examiner

*Primary Examiner*—Sandra O'Shea
*Assistant Examiner*—Mark Tsidulko

(57) ABSTRACT

A panel light source device comprises light sources, a light guide, and a reflector. The light guide defines a bottom surface and a top surface, and comprises grooves disposed on the bottom surface for receiving the light sources and pairs of first inclined surfaces disposed on the top surface and corresponding to the groove. The grooves and the first inclined surfaces cooperate with each other to transmit the light from the light source into the light guide. The reflector is disposed on the bottom surface of the light guide and covers the light source.

30 Claims, 6 Drawing Sheets

PANEL LIGHT SOURCE DEVICE AND LIQUID CRYSTAL DISPLAY DEVICE

CROSS-REFERENCE OF RELATED APPLIICATION

This application claims the priority benefit of Taiwan patent application serial No. 091120402, filed Sep. 2, 2002, the full disclosure of which is incorporated herein by reference.

BACKGROUND OF THE INVENTION

1. Field of the Invention

The present invention generally relates to a panel light device, and more particularly to a light guide of a back light module for a liquid crystal display.

2. Description of the Related Art

Referring to FIG. 1, it depicts the structure of a conventional liquid crystal display. Generally, the liquid crystal display device includes a liquid crystal panel 10 which has two substrates and a liquid crystal material sealed therebetween, a back light module 20 disposed, under the liquid crystal panel 10, and cases 11 and 12.

The back light module 20 is utilized to distribute the light from a light source uniformly over the surface of the liquid crystal panel 10. There are several kinds of back light modules 20 such as a direct back light type (or direct type) and an edge light type.

Referring to FIG. 2, which is a cross-sectional view along line 2—2 of FIG. 1, it depicts a back light module 21 of the direct type. The direct type back light module 21 includes a housing 70 which has a reflective sheet 60 disposed on the bottom surface of the housing 70 and, lamps 50, such as a fluorescence cathode tube, disposed at the bottom portion of the housing 70, a diffusing sheet 40 disposed on the top surface of the housing 70 and a prism sheet 30 disposed on the diffusing sheet 40. Since the lamps 50 are spacedly disposed inside the display area of the liquid crystal panel 10, the brightness distribution of the liquid crystal panel may be not uniform. Besides, the thin film transistors or the switching elements of the liquid crystal panel 10 may be damaged by the heat of the back light source.

Therefore, some distance or space between the lamp 50 and the diffusing sheet 40 is required. This distance or space is provided by means of supports 55 disposed in the housing 70. Typically, the distance between the center of the lamp 50 and the diffusing sheet 40 is required to be longer than a half distance between the adjacent lamps 50. Because of these structural requirements, it is very difficult to reduce the thickness of the direct type back light module 21. Furthermore, the lamp 50 also absorbs the light emitted from other lamps such that the optical efficiency is lowered.

Referring to FIG. 3, which is a cross-sectional view along line 2—2 of FIG. 1, it depicts a back light module 22 of the edge light type. The edge light type back light module 22 includes a light guide 80, a lamp 50 which is attached to at least one edge of the light guide 80, and a U-shaped reflector 61 which surrounds the lamp 50. An open portion of the reflector 61 is disposed at the edge of the light guide 80, a reflecting sheet 60 is disposed at the bottom of the light guide 80, a diffusing sheet 40 is disposed on the light guide 80 and a prism sheet 30 is disposed on the diffusing sheet 40. Because the lamp 50 is disposed at the edge of the light guide 80, the thickness of the LCD can be relatively decreased.

The light guide 80 includes a printed dot pattern or a V-shaped grooved pattern on one surface thereof and is typically made of PMMA by the process of molding. The diffusing sheet 40 is disposed on the light guide 80 and typically made of half-transparent polyethylene terephthalate (PET), polyethylene terephthalate, or polycarbonate for further evenly diffusing the light emitted from the light guide 80. The prism sheet 30 is disposed on the diffusing sheet 40 for gathering the light from the diffusing sheet 40 in the direction perpendicular thereto.

Since the liquid crystal panel 10 is illuminated by the light emitted from the light guide 80, the light guide 80 is required to uniformly or evenly illuminate over the liquid crystal panel 10. However, for the liquid crystal display of large dimensions in particular, the light guide 80 cannot provide even luminance. Furthermore, the manufacturing cost of the light guide 80 and the pattern thereon is relatively high.

For the back light module of the liquid crystal display in the prior art, there are many attempts made to increase the screen brightness, to provide uniform brightness, to lower power consumption and cost, as well as to decrease the dimension. Prior art attempts, for example, can be seen in U.S. Pat. No. 6,164,790 issued to Lee on Dec. 26, 2000, U.S. Pat. No. 5,477,422 issued to Hooker et al. on Dec. 19, 1995, and U.S. Pat. No. 5,485,354 issued to Ciupke et al. on Jan. 16, 1996. However, the back light modules in these patents and the other prior art still cannot meet the above-mentioned requirements.

Referring to FIG. 4a and FIG. 4b, they depict a back light module 23 having light sources of light emitting diodes in the prior art. The back light module 23 includes a light guide 80, a plurality of light emitting diodes 51 disposed beside the light guide 80, and reflectors 60, 62 respectively disposed on the bottom surface and on the side surface of the back light module 23. The back light module 23 cannot meet above-mentioned requirements, either, and particularly for the liquid crystal display of large dimensions, further cannot provide even light because the light emitting diode 51 is substantially a point light source instead of a linear light source, and located beside the back light module 23.

Accordingly, there exists a need for a back light module of a liquid crystal display capable of meeting the above-mentioned requirements.

SUMMARY OF THE INVENTION

It is an object of the present invention to provide a panel light source device capable of providing uniform luminance, being compact, and being manufactured at a lowered cost.

It is an object of the present invention to provide a back light module of a liquid crystal display capable of providing uniform luminance, being compact, and being manufactured at a lowered cost.

In order to achieve the above objects, the present invention provides a panel light source device comprising light sources, a light guide, and a reflector. The light guide defines a bottom surface and a top surface, and comprises grooves disposed on the bottom surface for receiving the light sources and pairs of first inclined surfaces disposed on the top surface and corresponding to the groove. The grooves and the first inclined surfaces cooperate with each other to transmit the light from the light source into the light guide. The reflector is disposed on the bottom surface of the light guide and covers the linear light source.

Accordingly, the panel light source can be free from the loss of the light energy which results from the inter-emitting and inter-absorption of the lamps, so the brightness thereof can be increased and the thickness thereof can be reduced. Since the brightness of the back light module is increased, the amount of prism sheets can be decreased or eliminated such that the cost of the back light module is lowered without decreasing the angle of view of the back light module. Furthermore, the light source in the back light module according to the present invention is embedded in the light guide, so the dimension of the back light module can be further reduced.

BRIEF DESCRIPTION OF THE DRAWINGS

Other objects, novel features, and advantages of the invention will become more apparent from the following detailed description when taken in conjunction with the accompanying drawing.

FIG. 4b is a schematic cross sectional view of the back light module with the light emitting diodes shown along line 4b—4b in FIG. 4a.

FIG. 8b is a schematic cross sectional view of the back light module with the light emitting diodes shown in FIG. 8a.

DESCRIPTION OF THE PREFERRED EMBODIMENT

Figure 1:
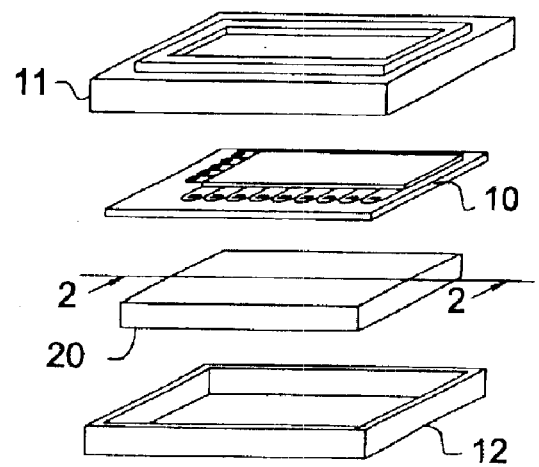
FIG. 1 is a schematic perspective exploded view of a liquid crystal display in the prior art.
Figure 2:
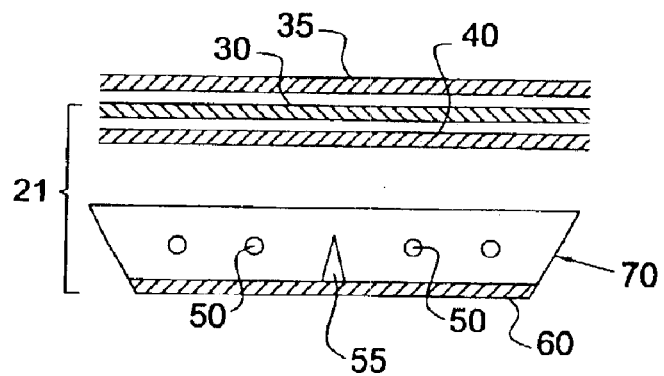
FIG. 2 is a schematic cross sectional view of a direct type back light module in the prior art along line 2—2 in FIG. 1.
Figure 3:
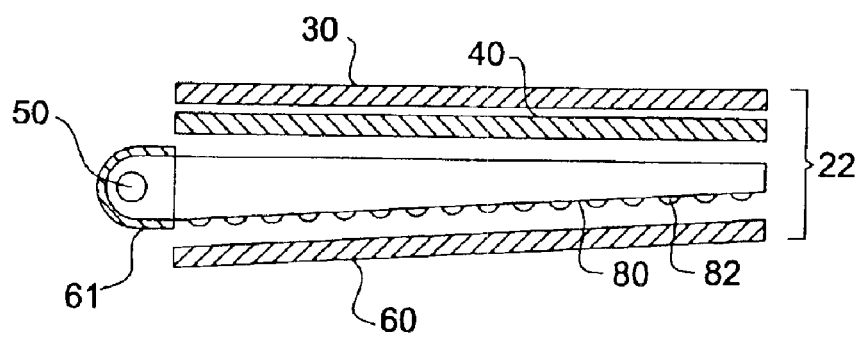
FIG. 3 is a cross sectional schematic view of an edge light type back light module in the prior art along line 2—2 in FIG. 1.
Figure 4A:
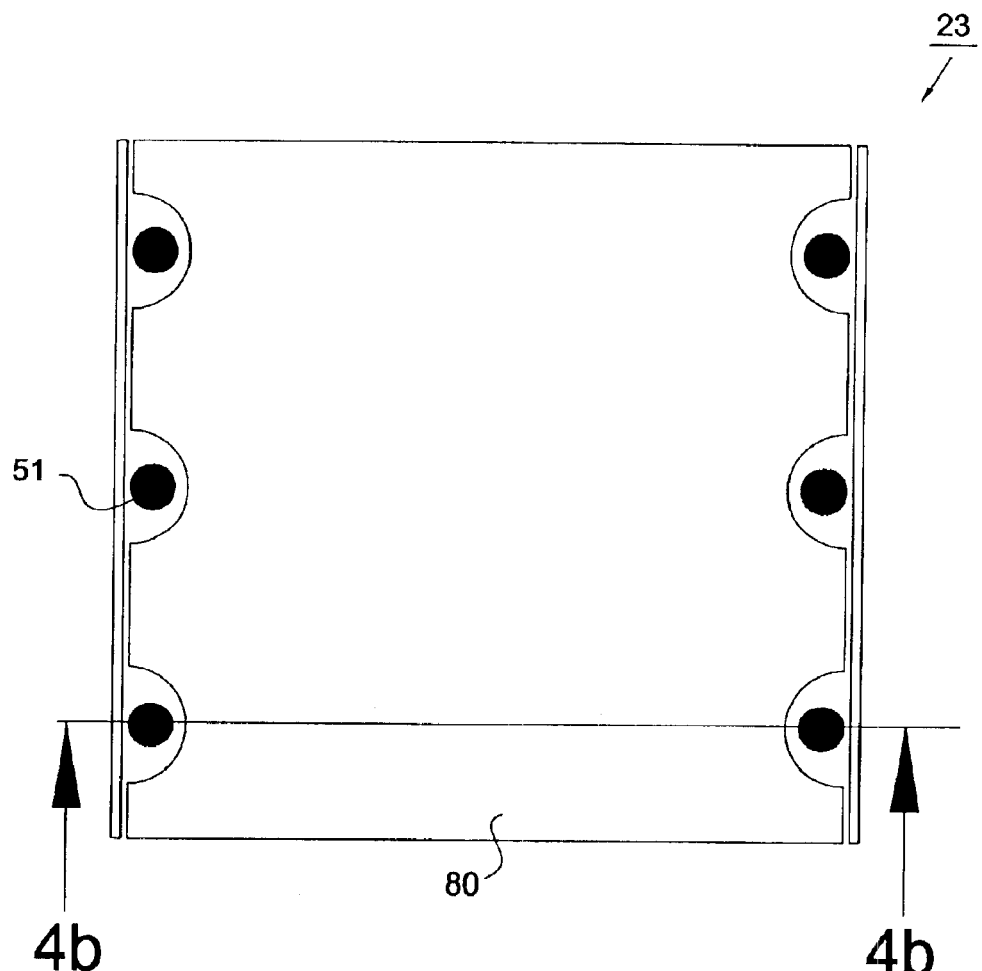
FIG. 4a is a schematic plan view of a back light module with light emitting diodes in the prior art.
Figure 4B:
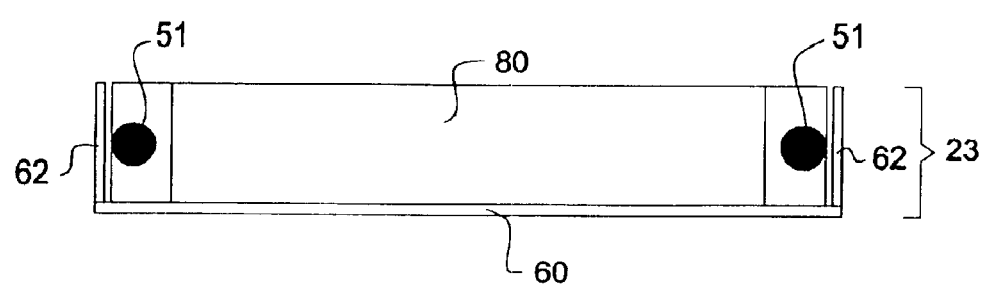
Figure 5:
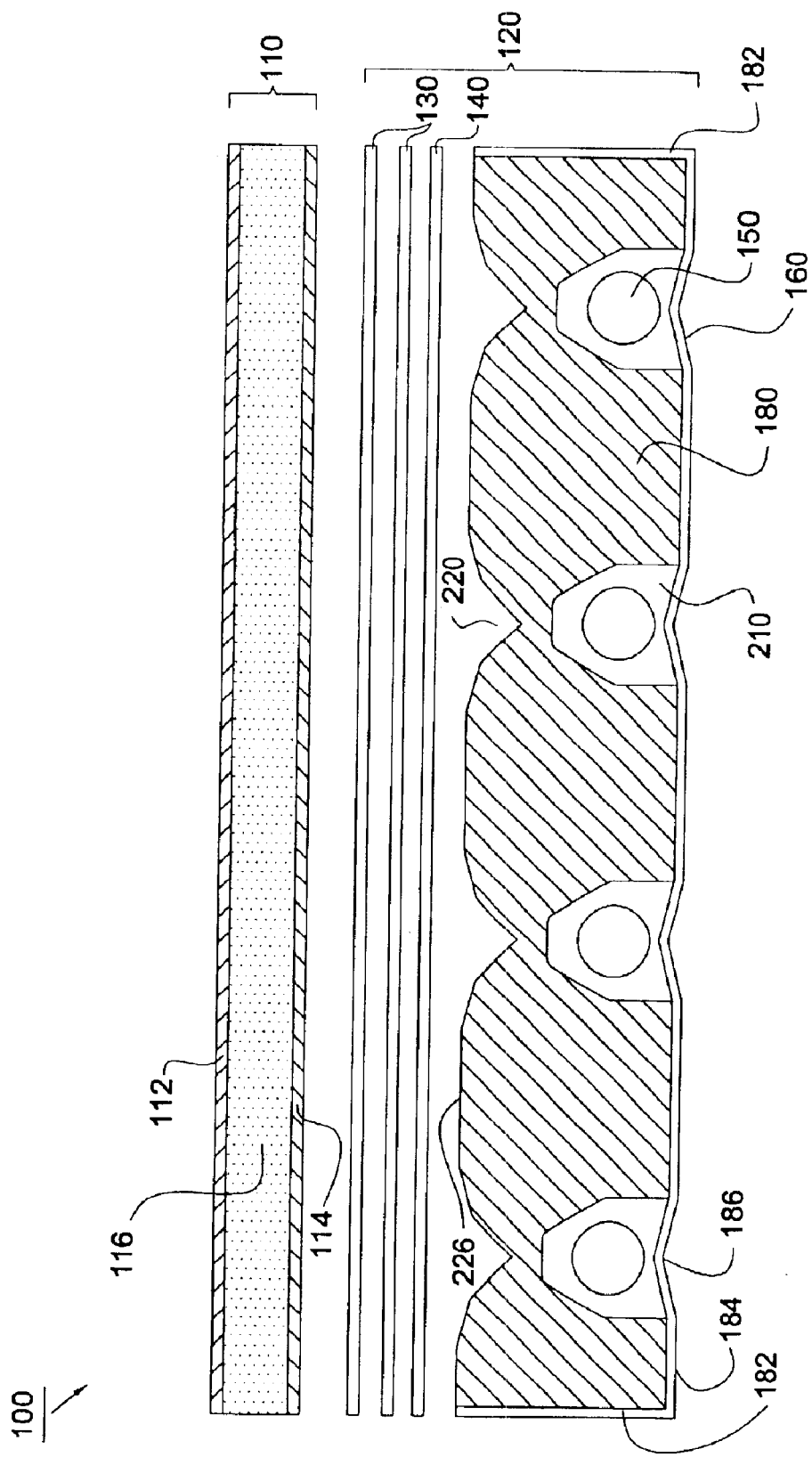
FIG. 5 is a schematic cross sectional view of a liquid crystal display according to an embodiment of the present invention.

Referring to FIG. 5, it depicts a liquid crystal display device 100 according to the present invention. The liquid crystal display device 100 includes a liquid crystal panel 110 and a back light module 120. The liquid crystal panel 110 has two transparent substrates 112, 114 and liquid crystal material 116 sealed therebetween. The two transparent substrates 112, 114 of the liquid crystal panel 110 are provided with switching elements for changing the arrangements of the molecular of the liquid crystal material 116 and thus generating images.

The back light module 120 is served as a panel light source device for uniformly emitting the light over the entire display area and illuminating the liquid crystal panel 110. The back light module 120 includes a plurality of linear light sources, such as lamps 150, a light guide 180, and a plurality of optical films, such as a diffusing sheet 140 and a prism sheet 130. The lamps 150 can be a cold cathode fluorescent lamp (CCFL).

The light guide 180 has a plurality of grooves 210 disposed on the bottom surface thereof for receiving the lamps 150 and has a plurality of notches 220 disposed on the top surface thereof. The location of the notch 220 is corresponding to that of the groove 210 and the notch 220 is utilized for cooperating with the groove 210 such that the light emitted from the lamp 150 can be transmitted into the light guide 180 and then diffused in the light guide 180 by the total internal reflection. Therefore, the light emitted from the lamp 150 can be transmitted through the light guide 180 and uniformly emitted from the top surface (the outgoing surface) 226 of the light guide 180 to uniformly illuminate the liquid crystal panel 110. The back light module 120 further has four side reflectors 182 and a bottom reflector 184. The side reflectors 182 are disposed around the light guide 180 for reflecting the light emitted to the sides of the light guide 180 back into the light guide 180. The reflector 184 is disposed on the bottom surface of the light guide 180 for reflecting the light emitted to the bottom surface of the light guide 180 back to the light guide. Besides, the reflector 184 is further provided with a plurality of ridges 186 respectively disposed under the lamps 150 for further transmitting the light from the lamps 150 into the light guide 180.

Figure 6:
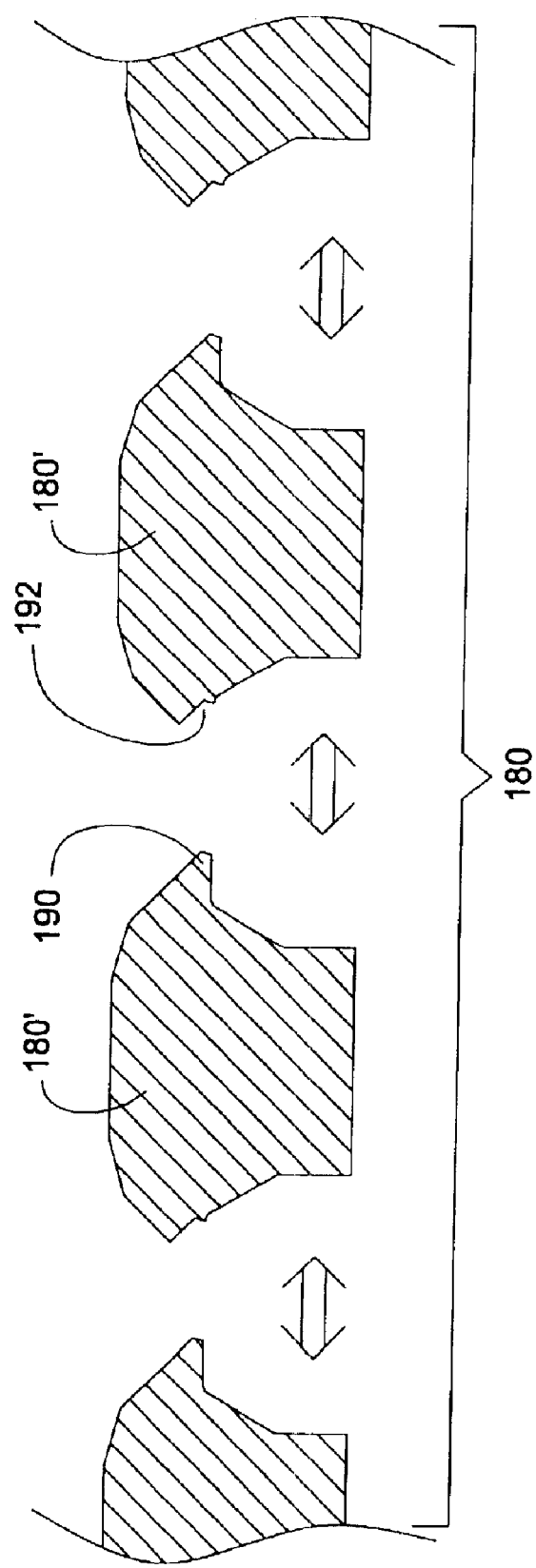
FIG. 6 is a schematic partial enlarged cross sectional view of a light guide in a back light module according to another embodiment of the present invention.

Generally, the light guide 180 is made of transparent material, such as Acrylic Resin (PMMA). The light guide 180 can be integrally formed, as shown in FIG. 5. However, according to another embodiment of the present invention, as shown in FIG. 6, the light guide 180 can also be formed by means of inter-engaging a plurality of modularized light guide elements 180' in series. The light guide element 180' has a snap portion 192 and a snap pin 190 engaged with the snap portion 192 so as to form the whole light guide 180.

Figure 7:
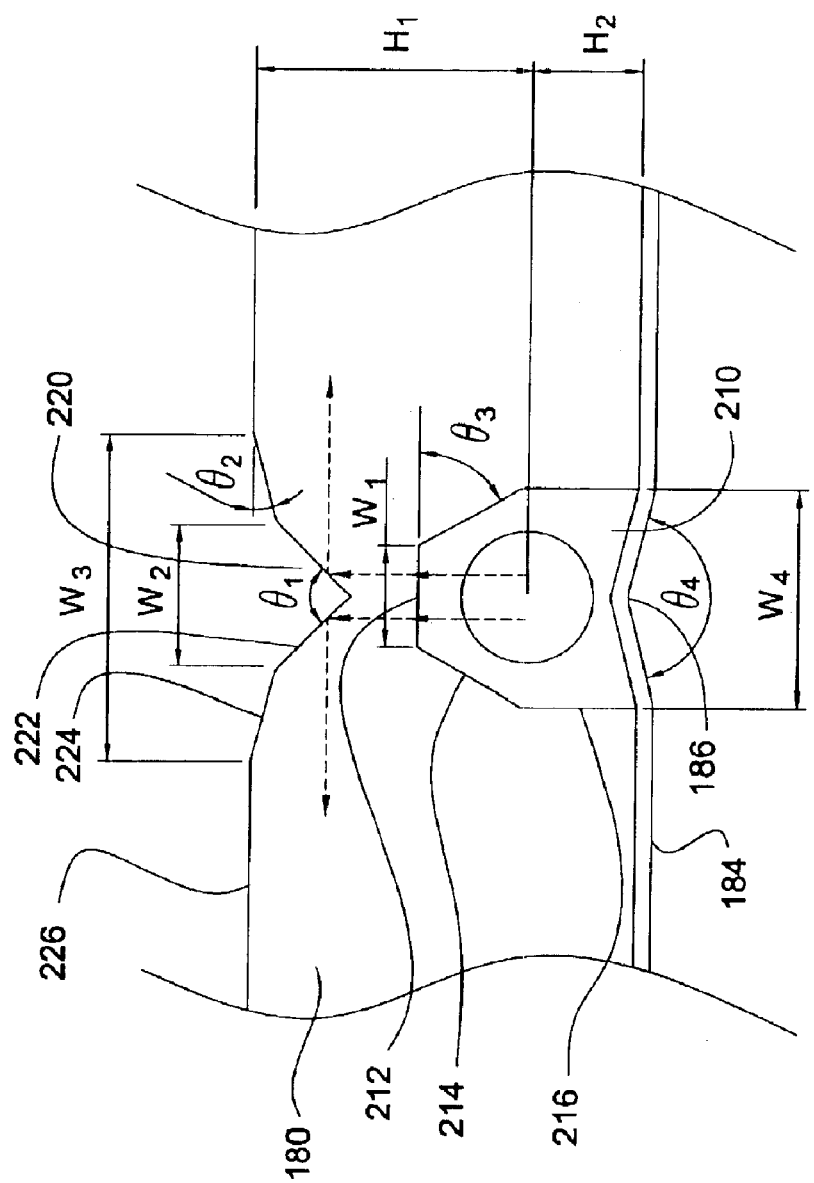
FIG. 7 is a schematic view of the light guide in the back light module according to the embodiment of the present invention for showing the dimensions thereof.

Referring to FIG. 7, it depicts the dimensions of the light guide 180 according to the embodiment of the present invention. As shown in FIG. 7, under the critical condition, the light emitted from the lamp 150 (as a phantom line shown in FIG. 7) is transmitted into the light guide 180 with a direction perpendicular to a horizontal surface 212 of a groove 210 and then to a pair of first inclined surfaces 222 of the notch 220 such that the angle Y has to be larger than 2*(90-X) for the total internal reflection. That is, for Acrylic Resin (index of refraction=1.49), the critical angle θc=42.9 degrees and thus $\theta_1$ has to be larger than 94.2 degrees. The width $W_1$ of a horizontal surface 212 of the groove 210 has to be substantially equal to the width $W_2$ of the two first inclined surfaces 222 of the notch 220.

According to the embodiment of the present invention, the groove 210 is further provided with a pair of slants 214 and the notch 220 is further provided with a pair of second inclined surfaces 224. The summation of the angle $\theta_3$ between slant 214 and the horizontal surface 212 of the groove 210 and the angle $\theta_2$ between the second inclined surface 224 of the notch 220 and the top surface 226 of the light guide 180 is less than 90 degrees. The width $W_3$ of the second inclined surface 224 of the notch 220 is larger than the height $H_1$ between the lamp 150 and the top surface 226 of the light guide 180, and preferably twice larger than the height $H_1$.

The width $W_4$ of the groove 210 (the distance between two vertical walls 216) is slightly larger than the diameter of the lamp 150 for providing a sufficient space for the heat dissipation of the lamp 150, avoiding the thermal conduction, and lowering the risk of the thermal deformation of the light guide 180, and the clearance between the vertical wall 216 and the lamp 150 is typically about 0.5 mm. Therefore, the width $W_4$ is larger than the diameter of the lamp 150 plus 1.0 mm. The angle $\theta_4$ of the ridge 186 is less than 180 degrees. The height $H_2$ between the lamp 150 and the bottom surface of the light guide 180 is larger than that of the ridge 186, i.e., $H_2>\tan(\theta_4/2)$. According to a geometric shape of the present invention, the groove 210 can meet the requirements of the total internal reflection and diffuse the light to avoid the uneven luminance above the lamp 150.

Furthermore, there are fillets or rounds at the junctions between the top surface 226 and the second inclined surface 224 of the light guide 180 and between the second inclined surface 224 and the first inclined surface 222 of the light guide 180 to avoid the uneven brightness at the junction. However, there are sharp edges (without a chamfer or fillet) at the junctions between the two first inclined surfaces 222, between the slant 214 and the horizontal surface 212, and between the slant 214 and the vertical wall 216 of the groove 210.

Figure 8A:
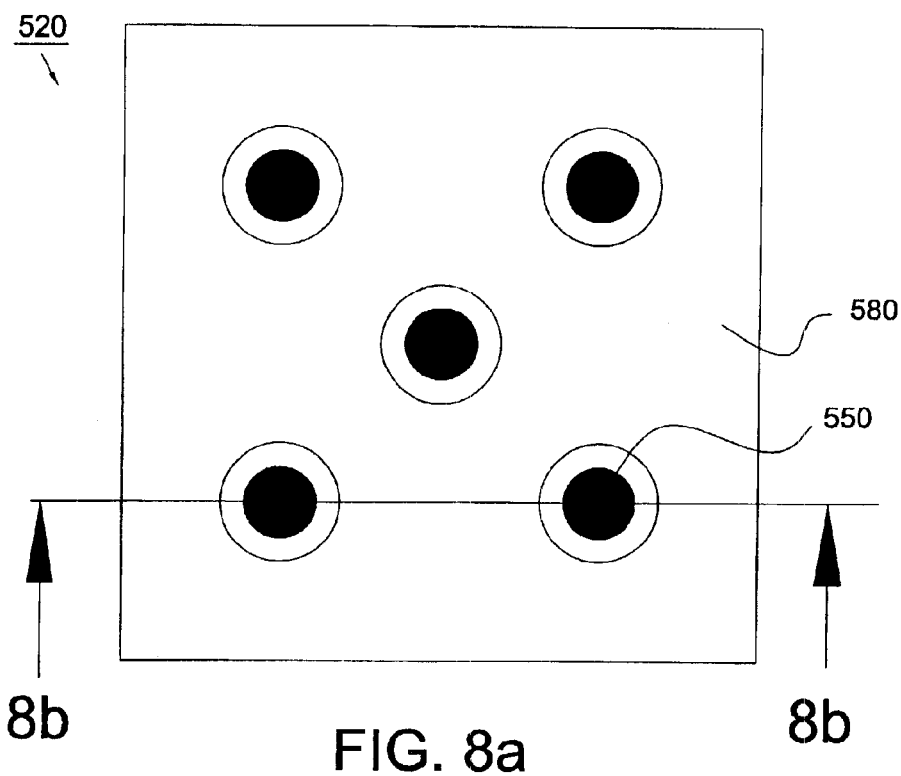
FIG. 8a is a schematic plan view of a back light module with light emitting diodes according to a further embodiment of the present invention.
Figure 8B:
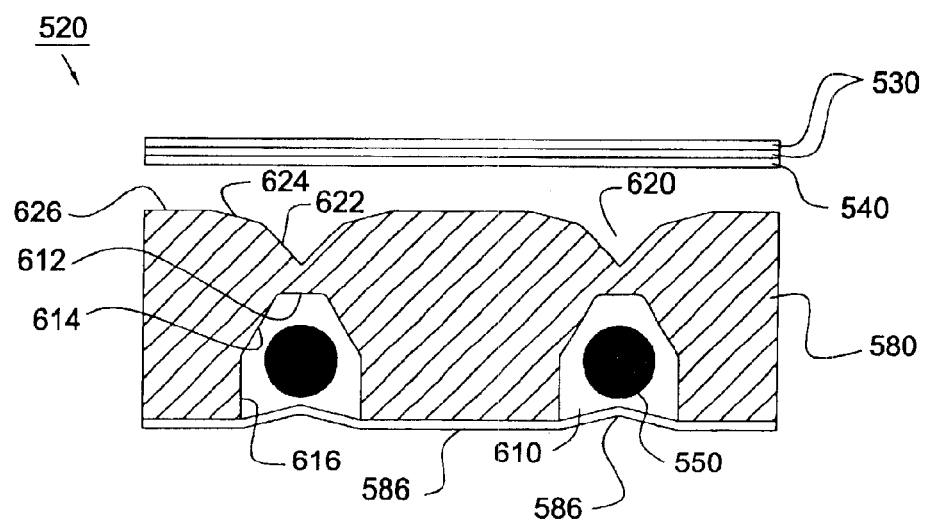

Referring to FIG. 8a and FIG. 8b, they depict a back light module 520 according to a further embodiment of the present invention. The back light module 520 is substantially similar to the back light module 120. The back light module 520 has a light guide 580 and a plurality of point light sources, such as light emitting diodes (LED) 550. The light guide 580 has a plurality of depressions 610 for receiving the light source 550 and has a plurality of recesses 620 respectively corresponding to the depressions 610. It will be apparent to those skilled in the art that the cross-sectional shapes of the depression 610 and the recess 620 is identical with that of the groove 210 and the notch 220 described hereinabove, and that as the foregoing description, the light guide 580 can be used for transmitting the light from the light source 550 into the light guide 580. Specifically, the depression 610 is substantially frusta-conical in shape and defines a horizontal surface 612, a frusta-conical surface 614 and a vertical wall 616, and the recess 620 defines a first conical surface 622 and a second conical surface 624.

The light source 550 of the light emitting diode is embedded in the depression 610 of the light guide 580 and the light emitted from the light source 550 is uniformly diffused by the light guide 580. Therefore, the back light module 520 according to the present invention can be served as a panel light source of a large area and adapted to the application of large dimension by means of only increasing the amount of the light emitting diodes.

As the foregoing description, the back light module or the panel light source according to the present invention has a light guide which has groove or depression portions for receiving linear light sources (lamps) or point light sources (light emitting diodes), and notches or recesses cooperating with the groove portions for transmitting the light emitting from the light source into the light guide.

Due to the light guide, the back light module or the panel light source can be free from the loss of the light energy which results from the inter-emitting and inter-absorption of the lamps, the brightness thereof can be increased, and the thickness thereof can be reduced. Since the brightness of the back light module is increased, the amount of prism sheets can be decreased or eliminated such that the cost of the back light module is lowered without decreasing the angle of view of the back light module. Furthermore, the light source in the back light module according to the present invention is embedded in the light guide, so the dimension of the back light module can be further reduced.

Although the invention has been explained in relation to its preferred embodiments, it is not used to limit the invention. It is to be understood that many other possible modifications and variations can be made by those skilled in the art without departing from the spirit and scope of the invention as hereinafter claimed.

What is claimed is:

1. A panel light source device comprising:
   at least one linear light source;
   a light guide defining a bottom surface and a top surface, and having at least one groove disposed on the bottom surface for receiving the linear light source and at least one pair of first inclined surfaces disposed on the top surface and corresponding to the groove for cooperating with the groove to transmit the light from the light source into the light guide; and
   a reflector disposed on the bottom surface of the light guide and covering the linear light source.

2. The panel light source device as claimed in claim 1, wherein the groove of the light guide defines a horizontal surface parallel to the bottom surface and a pair of vertical walls perpendicular to the bottom surface, and the width between the pair of first inclined surfaces is larger than or equal to the width of the horizontal surface.

3. The panel light source device as claimed in claim 1, wherein the light guide is made of a material of which the critical angle is X and the angle between the pair of the first inclined surfaces is larger than 2*(90-X) degrees.

4. The panel light source device as claimed in claim 1, wherein the groove of the light guide defines a horizontal surface parallel to the bottom surface and a pair of vertical walls perpendicular to the bottom surface, and further comprises a pair of slants connected to the vertical surface and the horizontal surface so as to further transmit the light from the linear light source into the light guide.

5. The panel light source device as claimed in claim 4, wherein the light guide further comprises at least a pair of second inclined surfaces connected to the top surface and the first inclined surfaces of the light guide.

6. The panel light source device as claimed in claim 5, wherein the summation of the angle between the second inclined surface and the top surface of the light guide and the angle between the slants and the horizontal surface of the groove is less than 90 degrees, and the distance between the second inclined surfaces is larger than the distance between a center of the linear light source and the top surface of the light guide.

7. The panel light source device as claimed in claim 1, wherein the reflector further comprises at least one ridge disposed under the groove of the light guide, extending into the groove of the light guide and defining two surfaces in respect to the linear light source, and the angle between the two surfaces is less than 180 degrees.

8. A panel light source device comprising:
   at least one point light source;
   a light guide defining a bottom surface and a top surface and having at least one depression disposed on the bottom surface for receiving the point light source and the first conical surface disposed on the top surface and corresponding to the depression for cooperating with the depression and transmitting the light from the point light source into the light guide; and
   a reflector disposed on the bottom surface of the light guide and covering the light source.

9. The panel light source device as claimed in claim 8, wherein the depression of the light guide defines a horizontal surface parallel to the bottom surface and a vertical wall perpendicular to the bottom surface, and the diameter of the first conical surface being larger than or equal to the diameter of the horizontal surface.

10. The panel light source device as claimed in claim 8, wherein the light guide is made of a material of which the critical angle is X and the angle of the first conical surface is larger than 2*(90-X) degrees.

11. The panel light source device as claimed in claim 8, wherein the depression of the light guide defines a horizontal surface parallel to the bottom surface and a vertical wall perpendicular to the bottom surface, and further comprises a frusta-conical surface connected to the vertical surface and the horizontal surface so as to further transmit the light from the point light source into the light guide.

12. The panel light source device as claimed in claim 11, wherein the light guide further comprises at least one second conical surface connected to the top surface and the first conical surface of the light guide.

13. The panel light source device as claimed in claim 12, wherein the summation of the angle between the second conical surface and the top surface of the light guide and the angle between the frusta-conical surface and the horizontal surface of the depression is less than 90 degrees, and the diameter of the second conical surface is larger than the distance between a center of the point light source and the top surface of the light guide.

14. The panel light source device as claimed in claim 8, wherein the reflector further comprises at least one ridge disposed under the depression of the light guide, extending into the depression of the light guide and defining a conical surface in respect to the point light source, and the angle of the conical surface is less than 180 degrees.

15. A panel light source device comprising:
   at least one light source;
   a light guide defining a bottom surface and a top surface, and having at least one depression disposed on the bottom surface for receiving the light source and at least one first inclined surface disposed on the top surface and corresponding to the depression for cooperating with the depression and transmitting the light from the light source into the light guide; and
   a reflector disposed on the bottom surface of the light guide and covering the light source.

16. The panel light source device as claimed in claim 15, wherein the depression of the light guide defines a horizontal surface parallel to the bottom surface, and the width of the first inclined surface in the direction parallel to the top surface is larger than or equal to the width of the horizontal surface.

17. The panel light source device as claimed in claim 15, wherein the light guide is made of a material of which the critical angle is X and the angle between the first inclined surface and the top surface is less than X.

18. The panel light source device as claimed in claim 15, wherein the depression of the light guide defines a horizontal surface parallel to the bottom surface, and further comprises a slant connected to the horizontal surface so as to further transmit the light from the light source into the light guide.

19. The panel light source device as claimed in claim 18, wherein the light guide further comprises at least one second inclined surface connected to the top surface and the first inclined surface of the light guide.

20. The panel light source device as claimed in claim 19, wherein the summation of the angle between the second inclined surface and the top surface of the light guide and the angle between the slant and the horizontal surface of the depression is less than 90 degrees, and the width of the second inclined surfaces in the direction parallel to the top surface is larger than the distance between a center of the light source and the top surface of the light guide.

21. The panel light source device as claimed in claim 15, wherein the reflector further comprises at least one ridge disposed under the depression, aligned with the light source, and extending into the depression of the light guide.

22. A liquid crystal display comprising:
   a liquid crystal display panel; and
   a back light module for illuminating the liquid crystal display panel, which comprises:
      at least one light source;
      a light guide defining a bottom surface and a top surface, and having at least one depression disposed on the bottom surface for receiving the light source and at least one first inclined surface disposed on the top surface and corresponding to the depression for cooperating with the depression and transmitting the light from the light source into the light guide; and
      a reflector disposed on the bottom surface of the light guide and covering the light source.

23. The liquid crystal display as claimed in claim 22, wherein the light source of the back light module is a linear light source.

24. The liquid crystal display as claimed in claim 22, wherein the light source of the back light module is a point light source.

25. The liquid crystal display as claimed in claim 22, wherein the depression of the light guide defines a horizontal surface parallel to the bottom surface, and the width of the first inclined surface in the direction parallel to the top surface is larger than or equal to the width of the horizontal surface.

26. The liquid crystal display as claimed in claim 22, wherein the light guide is made of a material of which the critical angle is X and the angle between the first inclined surface and the top surface is less than X.

27. The liquid crystal display as claimed in claim 22, wherein the depression of the light guide defines a horizontal surface parallel to the bottom surface, and further comprises a slant connected to the horizontal surface so as to further transmit the light from the light source into the light guide.

28. The liquid crystal display as claimed in claim 27, wherein the light guide further comprises at least one second inclined surface connected to the top surface and the first inclined surface of the light guide.

29. The liquid crystal display as claimed in claim 28, wherein the summation of the angle between the second inclined surface and the top surface of the light guide and the angle between the slant and the horizontal surface of the depression is less than 90 degrees, and the width of the second inclined surfaces in the direction parallel to the top surface is larger than the distance between a center of the light source and the top surface of the light guide.

30. The liquid crystal display as claimed in claim 22, wherein the reflector further comprises at least one ridge disposed under the depression, aligned with the light source, and extending into the depression of the light guide.

* * * * *